United States Patent [19]
Shido et al.

[11] Patent Number: 5,371,727
[45] Date of Patent: Dec. 6, 1994

[54] SCANNING TUNNEL MICROSCOPY INFORMATION PROCESSING SYSTEM WITH NOISE DETECTION TO CORRECT THE TRACKING MECHANISM

[75] Inventors: Shunichi Shido, Sagamihara; Katsunori Hatanaka, Yokohama; Kunihiro Sakai, Isehara; Takahiro Oguchi, Ebina; Akihiko Yamano, Sagamihara, all of Japan

[73] Assignee: Canon Kabushiki Kaisha, Tokyo, Japan

[21] Appl. No.: 961,386

[22] Filed: Oct. 15, 1992

[30] Foreign Application Priority Data

Oct. 15, 1991 [JP] Japan .................. 3-293907
Jun. 2, 1992 [JP] Japan .................. 4-168620

[51] Int. Cl.$^5$ .......................... G11B 7/00; G11B 9/00
[52] U.S. Cl. ................... 369/124; 369/126; 365/151; 250/306; 250/307
[58] Field of Search .............. 369/124, 126, 100; 250/306, 307, 423 F; 365/151

[56] References Cited

U.S. PATENT DOCUMENTS

| | | | |
|---|---|---|---|
| 5,036,490 | 7/1991 | Kajimura et al. | 365/151 |
| 5,107,112 | 4/1992 | Yanagisawa et al. | 250/306 |
| 5,128,533 | 7/1992 | Oguchi | 250/208.1 |
| 5,132,533 | 7/1992 | Kawase et al. | 250/306 |
| 5,132,934 | 7/1992 | Quate et al. | 365/151 |
| 5,149,989 | 9/1992 | Oguchi et al. | 307/311 |
| 5,150,035 | 9/1992 | Nose et al. | 324/71.1 |
| 5,170,238 | 12/1992 | Sakai et al. | 307/311 |
| 5,199,021 | 3/1993 | Hatanaka et al. | 369/126 |
| 5,202,879 | 4/1993 | Oguchi et al. | 250/306 |
| 5,220,555 | 6/1993 | Yanagisawa et al. | 369/126 |
| 5,222,060 | 6/1993 | Kuroda et al. | 369/126 |
| 5,282,191 | 1/1994 | Yamano et al. | 369/126 |
| 5,299,184 | 3/1994 | Yamano et al. | 369/126 |

FOREIGN PATENT DOCUMENTS 63-161552 7/1988 Japan .
63-161553 7/1988 Japan .

OTHER PUBLICATIONS

G. Binnig et al., "Scanning tunneling microscopy," May, 1983, Helvetica Physica Acta. vol. 55 pp. 726–735.

Primary Examiner—Paul M. Dzierzynski
Assistant Examiner—Kim-Kwok Chu
Attorney, Agent, or Firm—Fitzpatrick, Cella, Harper & Scinto

[57] ABSTRACT

An information processing apparatus effects at least one of recording, reproduction and erasure of information on a recording medium having a track groove by use of a probe electrode. Relative movement between the probe electrode and the recording medium is effected by the moving mechanism. A predetermined driving signal is inputted to the moving mechanism so that a predetermined movement of the probe electrode to the groove track is effected. The physical phenomenon caused between the probe electrode and the recording medium is detected, so that the track groove is detected and a correction value for correcting the movement of the probe electrode from the driving signal on the basis of the timing of the detection. The moving mechanism is controlled on the basis of the driving signal and the correction value.

2 Claims, 8 Drawing Sheets

SCANNING TUNNEL MICROSCOPY INFORMATION PROCESSING SYSTEM WITH NOISE DETECTION TO CORRECT THE TRACKING MECHANISM

BACKGROUND OF THE INVENTION

1. Field of the Invention

The present invention relates to an information processing apparatus for recording, reproducing or erasing information along a track groove provided on a recording medium, utilizing a physical phenomenon generated when a probe needle is maintained close to a specimen.

2. Related Background Art

Recent development of the scanning tunnel microscope (hereinafter abbreviated as STM) enabling direct observation of the electron structure on and in the vicinity of a specimen surface, utilizing the physical phenomena such as tunneling phenomenon generated when a probe needle is maintained at a small distance to the specimen [G. Binnig et al., Helvetica Physica Acta, 55,726 (1982)] has allowed measurement of the real space image with a high resolving power, both in the monocrystalline and amorphous substances. Also STM has the advantages of enabling observation with a low electric power consumption, without damage to the specimen by the current, and functioning not only under high vacuum but also in atmospheric condition or in solution, and is expected to be usable in various academic and research applications. Also its spatial resolving power of the atomic or molecular level has attracted attention in the industrial field, and, for example the Japanese Patent Application Laid-Open Nos. 63-161552 and 63-161553 proposed its application to a record/reproducing apparatus, employing a thin film of organic compounds containing $\pi$-electron system or chalcogenide compounds as the recording layer.

Such information process apparatus is generally designed to record information on the surface of a specimen by a certain electrical method while scanning said surface with a probe needle, and to reproduce the recorded information by measuring a physical phenomenon, such as the tunneling current generated by the close positioning of the probe needle and the specimen. For achieving smooth recording and reproduction of information, it is necessary to arrange information with certain regularity on the specimen. It is therefore desirable to record and read the information along a track groove, and, in an information record/reproducing apparatus, the addition of a tracking system is required.

Tracking is conducted by the detection of a track groove and the feedback control of the scanning area based on thus detected position, but the detection error of the tracking groove becomes an obstacle, particularly in a high-speed scanning required for example in the information processing apparatus, because said detection relies on a weak signal such as the tunneling current generated by the close positioning of the probe needle and the specimen. Thus, when the feedback amount is calculated from such detected information, the tracking operation is seriously affected as the feedback system shows instability such as oscillation or overshoot by noises.

SUMMARY OF THE INVENTION

The object of the present invention is to provide an information processing apparatus capable of avoiding the above-mentioned drawbacks and realizing stable feedback operation.

The above-mentioned object can be attained, according to the present invention, by an information processing apparatus for effecting at least one of recording, reproduction and erasure of information on a recording medium having a tracking groove by means of a probe electrode, comprising a probe electrode; moving means for effecting relative movement between said probe electrode and the recording medium; drive means for sending a predetermined drive signal to said moving means in such a manner that a predetermined movement of said probe electrode to said tracking groove is effected; detection means for detecting a physical phenomenon generated between said probe electrode and said recording medium; and correction value generating means for detecting the tracking groove formed on the recording medium, based on the output of said detection means, and generating a correction value for correcting said movement from said drive signal, based on the timing of said detection, wherein said moving means is controlled according to said drive signal and said correction value.

Details will be explained in the following embodiments.

DETAILED DESCRIPTION OF THE PREFERRED EMBODIMENTS

Now the present invention will be clarified in detail by preferred embodiments shown in the attached drawings.

Figure 1:
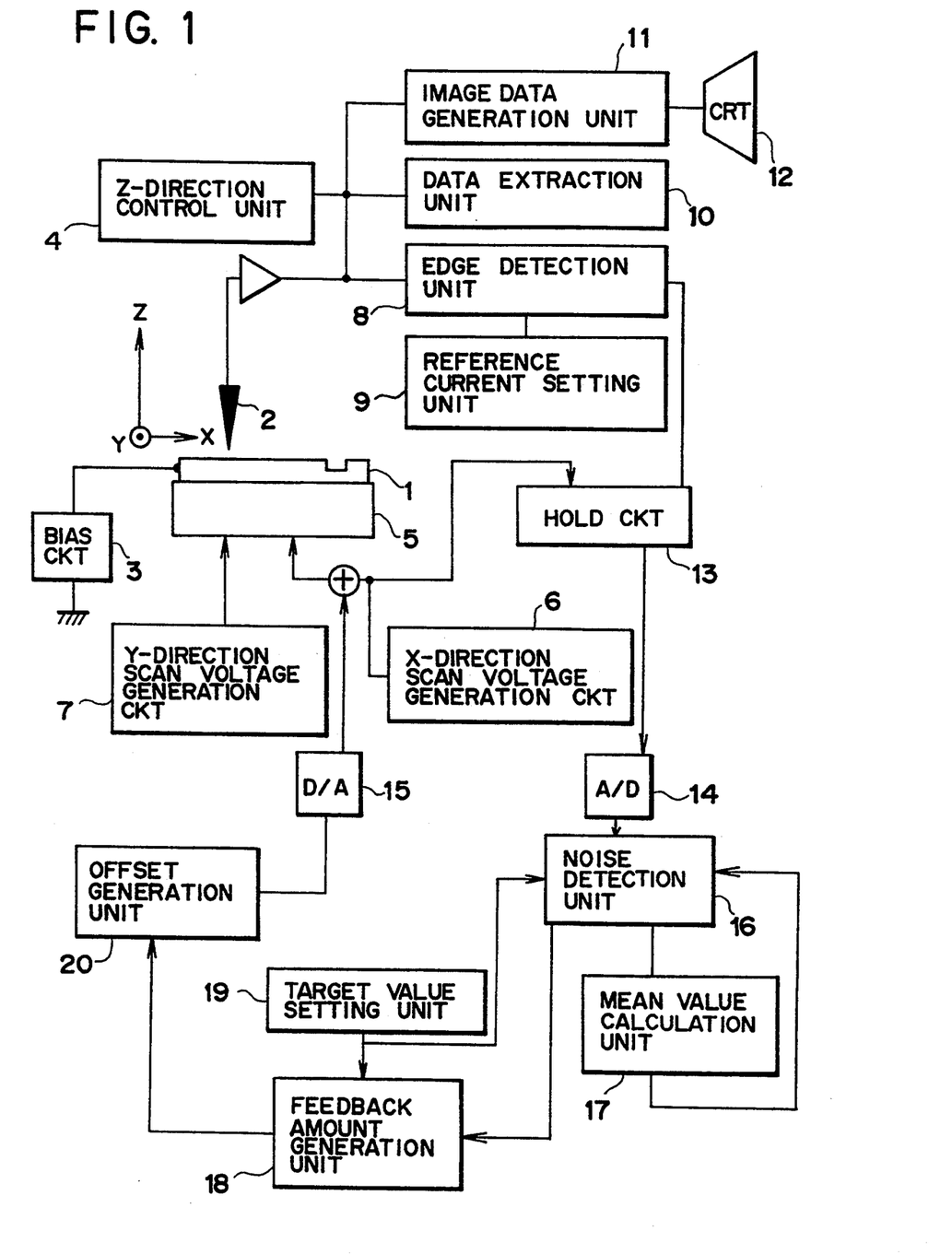
FIG. 1 is a block diagram of an embodiment of the information processing apparatus of the present invention.

There will be explained an embodiment of tracking in high-speed scanning, with a configuration shown in FIG. 1, employing a gold electrode provided with a groove formed by a semiconductor process, as the specimen.

At first there will be explained the functions of various units constituting the block diagram shown in FIG. 1. Between a specimen 1 and a probe electrode 2 there is applied a predetermined voltage is applied by a bias circuit 3, and a tunneling current induced by said voltage is supplied to an image data generation unit 11 for image output, a Z-direction control unit 4, a data extraction unit 10 and an edge detection unit 8 for tracking. The image data generation unit 11 generates image data from the received tunneling current signal and sends said image data to a monitor (CRT) 12. The Z-direction control unit 4 effects feedback control on the distance between the probe electrode 2 and the specimen 1 in such a manner that the tunneling current becomes constant.

The data extraction unit 10 extracts, in digital or analog manner, the recorded information from the tunneling current signal. The edge detection unit 8 compares the measured current with a predetermined current value determined in advance by a reference current setting Unit 9, and sends a voltage pulse of predetermined duration and height to a holding circuit 13 at the instant when the measured current becomes smaller.

The scanning motion of the probe electrode 2 in the X and Y-directions on the specimen 1 with reference to the tracking groove is induced by application of predetermined voltages from X, Y-direction scanning voltage generation circuits 6, 7 to piezoelectric elements mounted on an XY-stage 5. The scanning voltage is also held by the holding circuit 13 at the timing of edge detection, indicated by the pulse released from the edge detection unit 8, then converted into a digital value by an A/D converter 14 and is processed as tracking data. The digitized voltage signal is compared with an average value by a noise detection unit 16, and is forwarded to a feedback amount generation unit 18 depending on the result of said comparison. There is also provided an average calculating module 17.

Also the voltage value supplied to the feedback amount generation unit 18 is converted therein into a difference signal from a target value which is set by the target value setting unit 19 (which is the desired voltage at the edge detection, namely the X-direction scanning voltage when the edge is detected at the normal position within the X-direction scanning area). The offset generation unit 20 generates an offset value from said difference signal, and supplies the tracking voltage to the stage through the D/A converter 15, by adding said offset value to the scanning voltage.

Figure 2:
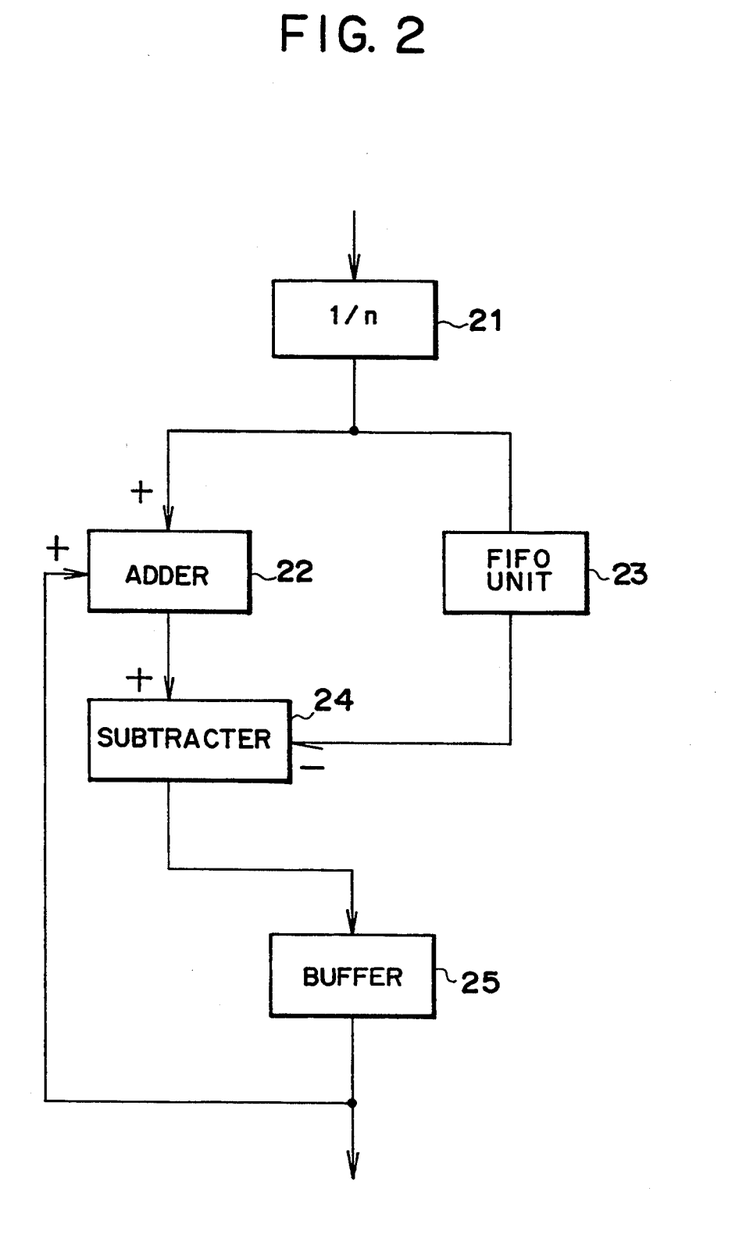
FIG. 2 is a block diagram showing the process of calculation of average of the tracking groove detection values in the apparatus shown in FIG. 1.

Now reference is made to FIG. 2 for explaining the method of average calculation. The output voltage of the noise detection unit 16 is divided by a number n of averaging in a 1/n calculation unit 21, and the divided data is supplied to an adder 22 and a FIFO unit 23. Said FIFO unit 23 stores n data in the past, and releases oldest data upon receipt of the new-data. The adder 22 adds the new data and old data stored in the buffer, and sends the sum to a subtractor 24, which subtracts the oldest data, outputted from the FIFO unit 23, from the sum outputted from the adder 22, and sends the obtained result to the buffer.

Thus the average of n data is obtained by adding the new data to and subtracting the n-th old data from the average. The average data in the buffer is referred to at the noise detection.

Figure 3A:
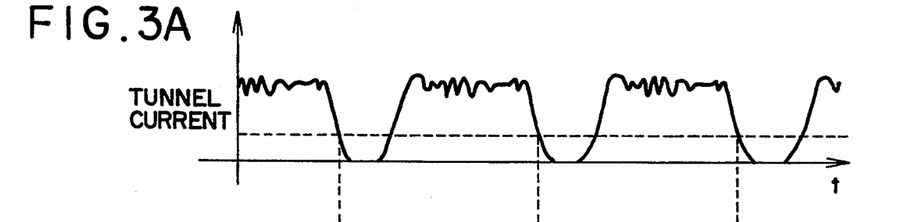
FIGS. 3A to 3D are waveform charts showing the tunneling current, tracking groove edge detection pulse signal, scanning voltage and detected voltage (holding circuit output) in the course of a scanning operation in the apparatus shown in FIG. 1.
Figure 3B:
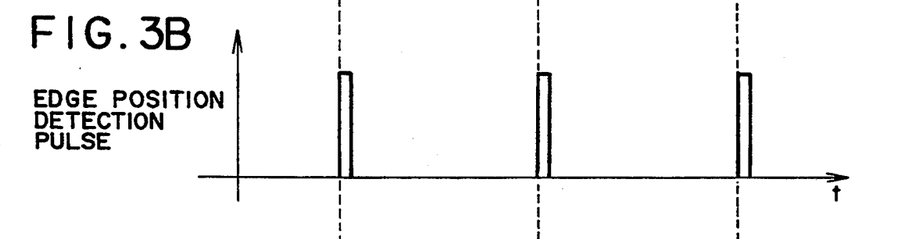
Figure 3C:
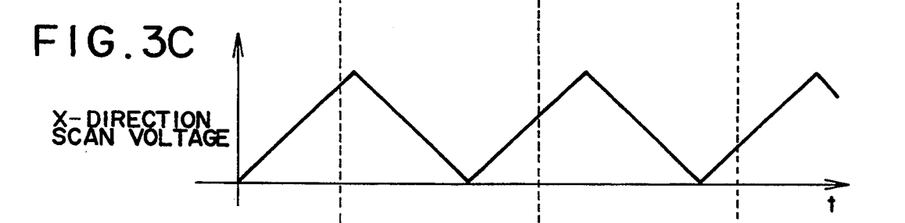
Figure 3D:
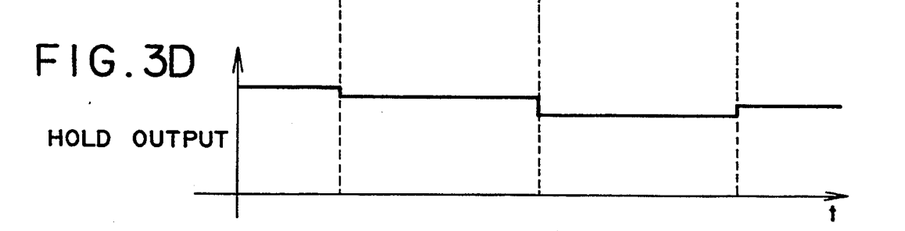

The details of the tracking mechanism will be explained in the following, with reference to FIGS. 3A to 3D. When the tunneling current (FIG. 3A) becomes smaller than a reference value, the edge detection unit 8 sends a pulse signal indicating the timing of edge detection (FIG. 3B) to the holding circuit 13, which samples the X-direction scanning voltage at the timing of said pulse signal (FIG. 3C) and holds the sampled voltage (FIG. 3D). In case of normal edge detection, the difference signal is calculated from thus held voltage at the timing shown in FIGS. 3A to 3D, and is added to the offset.

In the following there will be explained a case in which the detected position contains a large noise. In general, the drift resulting from temperature or vibration is much slower than the scanning frequency. Also the shape of groove edge can now be made sharp in the order of nanometer, through the use of a semiconductor process.

However, in the edge detection utilizing the method of STM, though an extremely large change cannot be expected in the position of edge detection each time, there will result a mismatching with the feedback in the Z-direction as the scanning frequency grows larger. Stated differently, the edge detection utilizing the method of STM may cause a perturbation in the edge detecting position independent from the edge shape.

In order to avoid such error, the noise detection unit 16 is provided for eliminating the detection voltage, which is caused by the perturbation in the feedback in the Z-direction and is irrelevant from the edge shape.

Figure 4A:
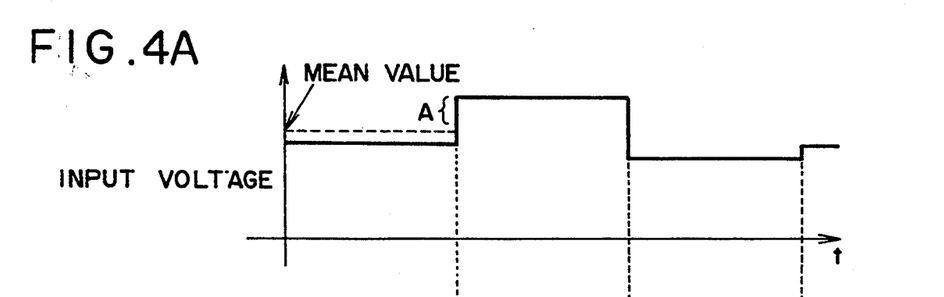
FIGS. 4A to 4C are waveform charts showing the input voltage and output value of a noise detection unit shown in FIG. 1, and the output value of an offset generation unit therein.
Figure 4B:
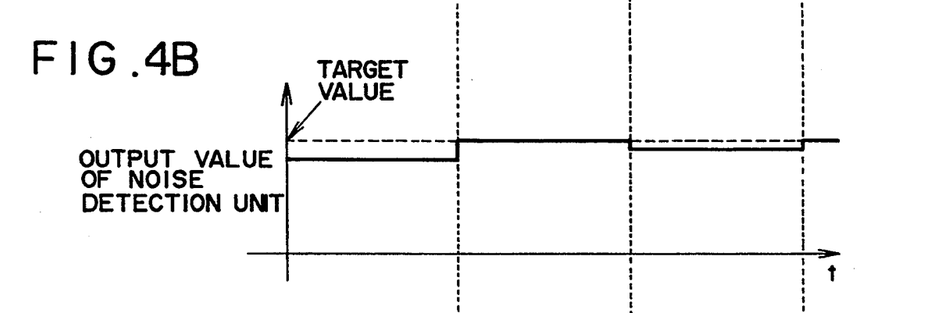
Figure 4C:
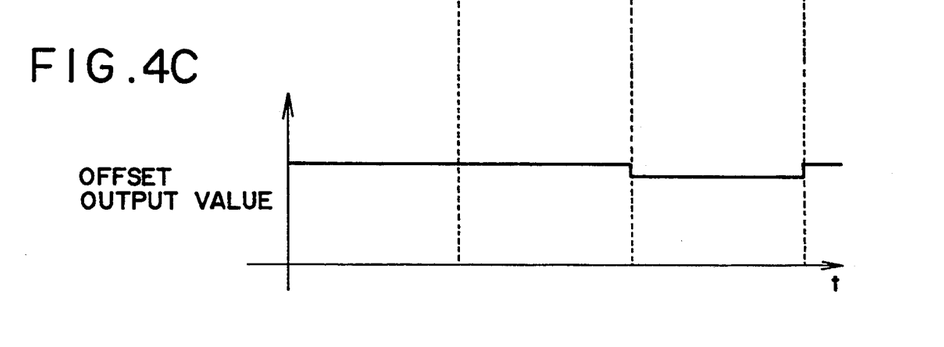

FIG. 4A shows the input voltage, FIG. 4B shows the output of the noise detection unit, and FIG. 4C shows the offset output value. In response to a large variation in the input voltage, the noise detection unit 16 calculates the difference A from the average value (broken line) obtained from the average calculation unit, and compares said difference A with a predetermined limit variation. If said difference A is larger than the limit variation, the variation in the input voltage is identified as a noise, and the output of the noise detection unit 16 is set as the target voltage of the target value setting unit 19. Thus the feedback amount generation unit 18 provides a zero output, and the stage does not move because the offset amount is not varied.

Also the voltage in such state is not supplied to the average calculation unit 17, so that the noise signal is not included in the average calculation. It is therefore rendered possible to suppress the detection error resulting from a fast scanning, and to prevent the feedback based on the erroneous information.

The recording medium, constituting the specimen 1, was composed of an Au film, formed on a glass substrate and provided with tracking grooves, in lines and spaces of 2 $\mu$m each by a semiconductor process. The depth and length of the groove were respectively ca. 30 nm and 30 $\mu$m. The scanning was conducted with a width of 1 $\mu$m, a length of 10 $\mu$m and a frequency of 500 Hz.

In a feedback control based solely on the difference signal without the above-mentioned target value setting unit 19, the tracking accuracy was about 15 nm. The range of fluctuation in the edge of tracking grooves prepared by the semiconductor process was revealed as several Angstroms at maximum, as observed under an electron microscope, and the above-mentioned accuracy is significantly inferior to said fluctuation range.

On the other hand, a tracking control employing the noise detection unit 16, with a limit variation of ±5 nm with respect to the average of 10 scanning operations in the past provided a fluctuation range of about 0.5 nm, which was about same as the fluctuation range resulting from the groove structure. Thus a major improvement in the accuracy was confirmed.

In the following there will be explained another embodiment, employing the above-explained information processing apparatus and effecting information recording, reproduction and erasure, utilizing a recording medium composed of an Au electrode and a two-layered Langmuir-Blodgett (LB) film of squarelium-bis-6-octylazulene (SOAZ) laminated thereon, as disclosed in the Japanese Patent Application Laid-Open Nos. 63-161552 and 63-161553.

The Au electrode was provided with tracking grooves prepared by a semiconductor process as in the foregoing embodiment. The scanning motion of the probe electrode was conducted with a width of 1 µm and a length of 10 µm in the X and Y-directions, and the tracking was conducted with the apparatus of the configuration shown in FIG. 1. The electrical information recording was conducted by the application, between the specimen and the probe electrode, of a voltage superposed by consecutive pulses of heights of −6 V and +1.5 V by the bias circuit 3.

It was then confirmed that the reproduced information coincided with the recorded information, by extracting data from the obtained tunneling current and repeating such data reproduction plural times.

It was also confirmed, from the result of image processing of the tunneling current, that the repeatedly reproduced image data mutually coincided with an error as small as 0.1 nm. It was furthermore confirmed, from the reproduced tunneling current image and the extracted information, that the recorded information could be erased by superposing a pulse voltage of a height of 3 V to the bias voltage when the probe electrode was brought close to the recorded area.

In the foregoing there has been explained an information processing apparatus designed to measure the tunneling current as the physical information, but the present invention is likewise applicable to systems employing weak signals such as of interatomic force, capacity, magnetic flux or magnetic force.

In the following there will be explained still another embodiment of the present invention.

Figure 5:
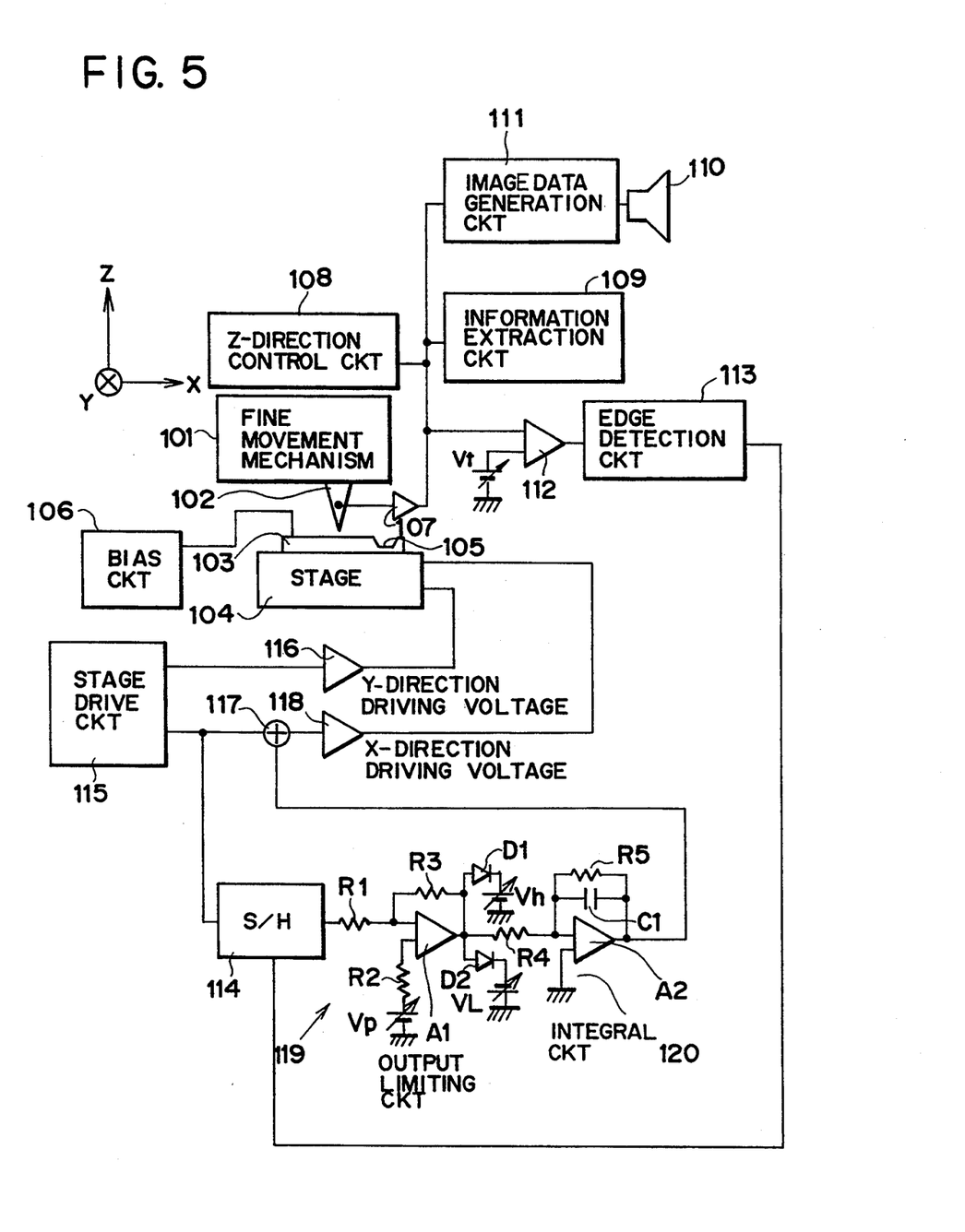
FIG. 5 is a block diagram of another embodiment of the information processing apparatus of the present invention.

FIG. 5 is a block diagram of an information processing apparatus, in which a probe electrode 102 mounted on a fine movement mechanism 101, movable in the Z-direction, is positioned opposite to a flat electrode substrate 103. Said electrode 103, composed of gold, is supported by a stage 104 movably in the X, Y plane. The surface of said electrode constitutes the recording medium, and is provided with tracking grooves 105 parallel to the Y-axis. Also a bias circuit 106 is connected to apply a voltage between said substrate and the probe 102. A current amplifier 107 is connected to the probe 102 for converting the tunneling current from the bias circuit 106 into a voltage. The output of the current amplifier 107 is supplied to a Z-direction control circuit 108 for driving the fine movement mechanism 101, an information extraction circuit 109 for extracting the recorded information from the tunneling current data, an image data generation circuit 111 for generating image data for supply to a monitor 110, and a comparator 112.

A reference voltage Vt is supplied to the other input terminal of the comparator 112, the output terminal of which is connected to an edge detection circuit 113. The output terminal of comparator 112 is connected to the timing input terminal of a sample hold circuit 114. A stage drive circuit 115 is connected, through a Y-direction buffer 116, to an unrepresented piezo-electric element of X-direction provided on the stage 104, also is connected, through an adder 117 and an X-direction buffer 118, to an unrepresented piezoelectric element of Y-direction provided also on the stage 104, and releases such driving voltage as to cause a high-speed scanning motion of the electrode substrate 103 in the X-direction and a scanning motion in the Y-direction. The X-direction output terminal of the stage drive circuit 115 is connected to an adder 117 and the input terminal of the sample hold circuit 114, the output terminal of which is connected, through an output limiting circuit 119 and an integrating circuit 120, to the other input terminal of the adder 117.

In said output limiting circuit 119, the output terminal of the sample hold circuit 114 is connected through an input resistor R1 to a first input terminal of an amplifier A1, while a position reference voltage Vp is supplied through an input resistor R2 to a second input terminal of the amplifier A1, and the first input terminal of the amplifier A1 and the output terminal thereof are connected through a feedback resistor R3. The output terminal of the amplifier A1 is connected, through a diode D1, to the positive side of an upper limit voltage Vh, and, through a diode D2, to the negative side of a lower limit voltage VL. In the integrating circuit 120, the output terminal of the amplifier A1 of the output limiting circuit 119 is connected through an input resistor R4 to a first input terminal of an amplifier A2. Said input terminal is connected, through a parallel circuit of a resistor R5 and a capacitor C1, to the output terminal of said amplifier A2, and a second input terminal thereof is grounded. The output terminal of said amplifier A2 is connected to the input terminal of the adder 117.

The electrode substrate 103 and the probe 102 are maintained in advance, by an unrepresented mechanism, to a distance generating a tunneling current therebetween, and a predetermined voltage is applied therebetween by the bias circuit 106. A voltage converted from the tunneling current generated by the abovementioned applied voltage between the electrode substrate 103 and the probe 102 is supplied to the image data generation circuit 111, the Z-direction control circuit 108, the information extraction circuit 109 and the comparator 112 for detecting the position of the tracking groove.

The image data generation circuit 111 generates image data from the obtained tunneling current signal and sends said image data to the monitor 110. The Z-direction control circuit 108 effects feedback control on the distance between the probe 102 and the electrode substrate 103 in such a manner that the tunneling current becomes constant, by actuating the fine movement mechanism 101. The information extraction circuit 109 extracts the recorded information, from the tunneling current data, in digital or analog form. The comparator 112 compares the measured current with a reference current predetermined by the reference voltage Vt, and sends the result of comparison to the edge detection circuit 113, which sends a predetermined voltage pulse to the sample hold circuit 114 at the instant of edge detection of the tracking groove 105.

The scanning motion in the X, Y-directions is conducted by the supply of voltages from the stage drive circuit 115 to the unrepresented piezoelectric elements mounted on the stage 104. In the scanning in the X-direction, the voltage held in the sample hold circuit 114 at the timing of the pulse signal from the edge detection circuit 113 is supplied through the output limiting circuit 119 and the integrating circuit 120 to generate the offset value, which is added in the adder 117 to the X-direction scanning voltage, and the obtained X-direction driving voltage is supplied, through the X-direction buffer 118, to the X-direction piezoelectric element of the stage 104.

Figure 6A:
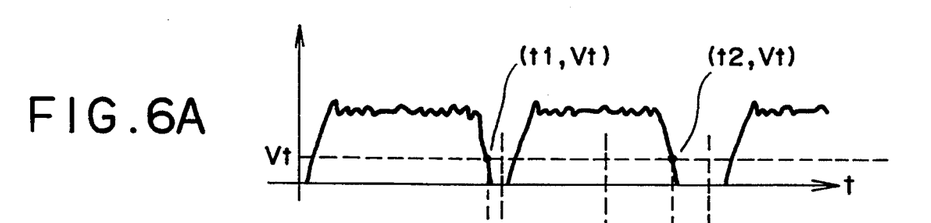
FIGS. 6A to 6E are waveform charts showing signals in the course of operation of the apparatus shown in FIG. 5.
Figure 6B:
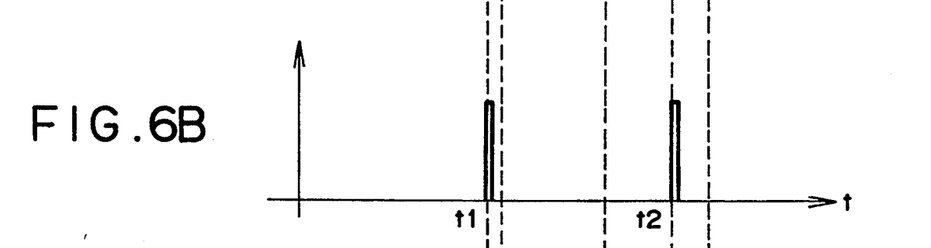
Figure 6C:
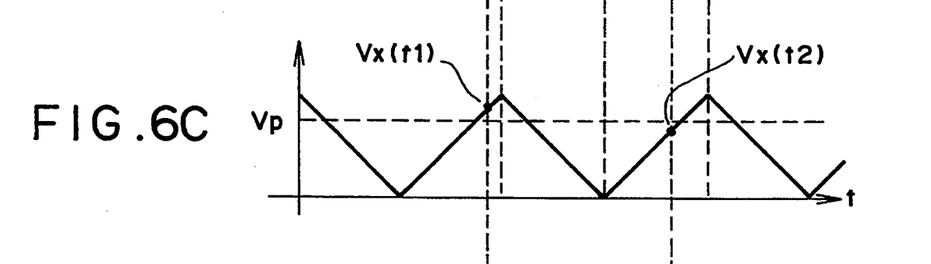
Figure 6D:
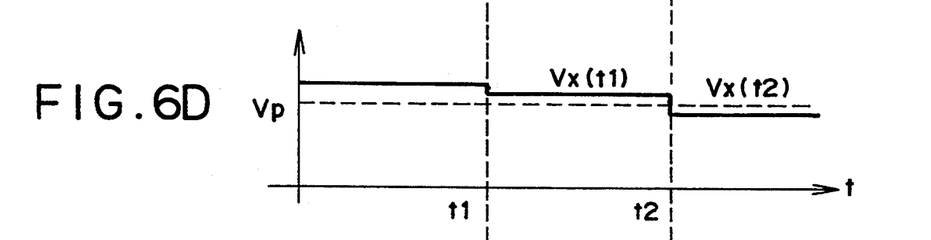
Figure 6E:
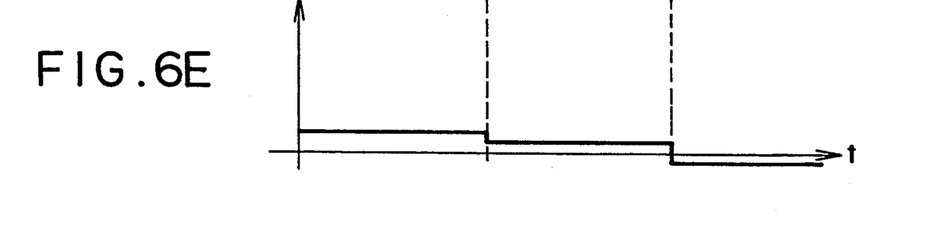

In the following there will be explained the details of function of the tracking mechanism, with reference to FIGS. 6A to 6E. When the probe 210 crosses the tracking groove 105, there is observed an abrupt decrease in the tunneling current as shown in FIG. 6A, because the change in the tunneling current is faster than the response of the fine movement mechanism 101 in the Z-direction. When the voltage converted from the tunneling current becomes smaller than the reference voltage Vt, the edge detection circuit 113 sends a pulse signal shown in FIG. 6B, indicating the timing of detection, to the sample hold circuit 114 which in response samples the X-direction scanning voltage shown in FIG. 6C and holds the sampled voltage, assuming a stepwise form as shown in FIG. 6D. Thus, in case of a normal edge detection, an error signal shown in FIG. 6E is outputted from the output limiting circuit 119. In this manner, an edge position detection and feedback are effected in each scanning operation. However, the function becomes somewhat different in case the edge detection is not normal.

In general, the drift resulting from temperature or vibration is much slower than the scanning frequency. Also the linearity of groove edge has been improved to the level of nanometer by the use of semiconductor process. Consequently, an extreme variation in the position of edge detection cannot be expected within a scanning operation in case of a high-speed scanning in which the interval of edge detection is short. In practice, however, the high-speed scanning operation generates a perturbation in the position of edge detection irrelevant from the edge shape, due to mismatching with the feedback operation in the Z-direction. This phenomenon is presumably ascribable to the influence of smoothness of the substrate electrode in the areas other than the tracking grooves 105, and such perturbation in the position of edge detection results in unstable function of the feedback system such as oscillation or overshoot.

Figure 7A:
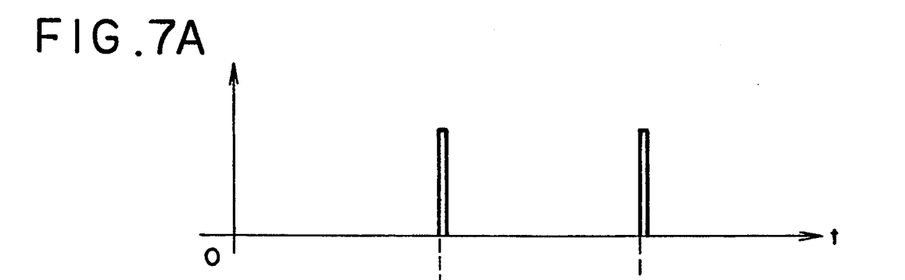
FIGS. 7A to 7C are waveform charts showing signals in the course of another operation of the apparatus shown in FIG. 5.
Figure 7B:
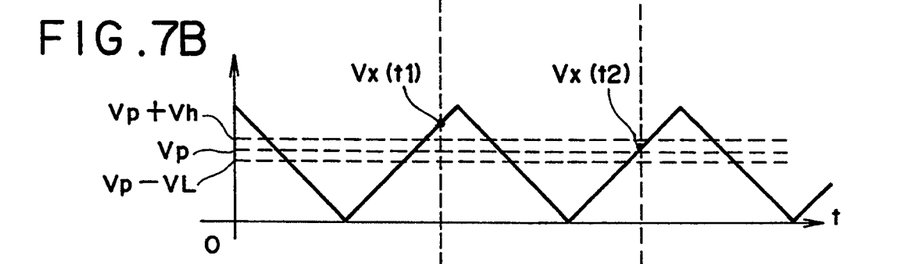
Figure 7C:
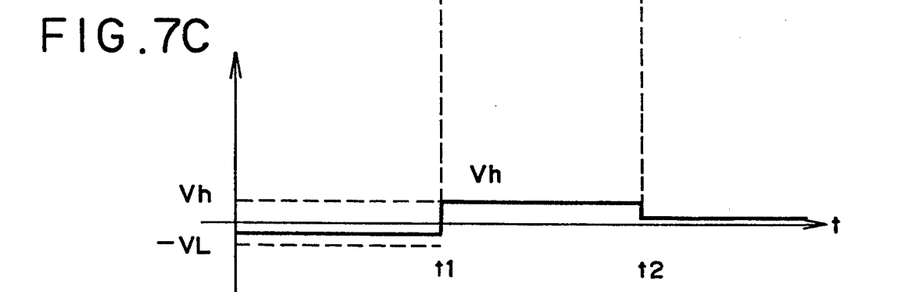

Therefore, in order to suppress the movement of the stage 104 resulting from such detection noises and to achieve stable feedback operation, the output limiting is conducted in the output limiting circuit 119. FIGS. 7A, 7B and 7C respectively show the edge detection pulse, the X-direction scanning voltage and the output of the output limiting circuit 119. The output limiting circuit 119 compares the held voltage with a reference voltage, and, if the difference is larger than an upper limit voltage Vh or smaller than a lower limit voltage VL, the output limiting circuit 119 is adjusted to output said upper limit voltage Vh or said limit voltage VL. In this manner the feedback voltage cannot exceed a certain constant value, so that the overshooting etc. becomes less prone to occur.

It is also possible to regulate the feedback gain by varying the feedback resistor R3 of the output limiting circuit 119, thereby controlling the oscillation or response speed of the feedback system. The instability in feedback, resulting from fluctuation in edge detection based on the error in groove edge detection, can thus be alleviated.

In the experiment, the recording medium was composed of an Au film, formed on a glass substrate and provided with tracking grooves, in lines and spaces of 2 μm each by a semiconductor process. The depth and length of the tracking groove 105 were respectively ca. 50 nm and 30 μm. The scanning was conducted with a width of 1 μm in the X-direction and a length of 10 μm in the Y-direction, and with a speed of 500 Hz in the X-direction, and the edge detection and feedback were conducted once in each scanning operation in the X-direction.

Figure 8:
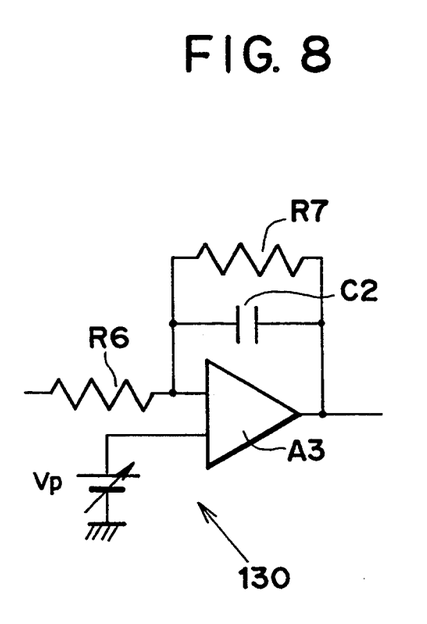
FIG. 8 is a circuit diagram of an integrating circuit.

At first a feedback control based solely on the difference signal without the above-mentioned output limiting circuit 119 was conducted by the replacing the output limiting circuit 119 and the integrating circuit 120, shown in FIG. 5 with the integrating circuit 130 shown in FIG. 8. In said integrating circuit 130, a first input terminal of an amplifier A3 is connected to an input resistor R6, while a second input terminal of said amplifier A3 is supplied with a position reference voltage Vp, and the first input terminal is connected to the output terminal through a parallel circuit of a resistor R7 and a capacitor C2. With this circuit configuration, the fluctuation of the track groove 105 on the output image on the monitor 110 was about 10 nm. The range of fluctuation in the edge of tracking grooves prepared by the semiconductor process was revealed as several nanometers for a length of 1 μm, according to the observation under an electron microscope, and the above-mentioned fluctuation is apparently larger than the latter.

Then an experiment was conducted with the circuit including the output limiting circuit 119. As the magnitude of ordinary temperature drift in the scanning operation of 500 Hz can be considered as 0.5 nm at maximum per scanning, and as the fluctuation in the edge shape can be considered as 1 nm or less per scanning, the upper and lower limit voltages were so determined as to correspond to ±1.5 nm with respect to the target position where the tracking groove 105 is to be fixed within the scanning area. Also the feedback gain determined from the resistors R1, R2, R3 of the output limiting circuit 119 was determined as 0.5. As a result, the tracking groove 105 could be stopped on the image, and the range of fluctuation in feedback was limited to 2 nm or less. A stable tracking operation without oscillation could therefore be confirmed.

Then this information processing apparatus was employed in an experiment of information recording, reproduction and erasure, utilizing a recording medium composed of an Au electrode and a two-layered Langmuir-Blodgett (LB) film of squarelium-bis-6-octylazulene (SOAZ) laminated thereon, as disclosed in the Japanese Patent Application Laid-Open Nos. 63-161552 and 63-161553. The Au electrode was provided with tracking grooves prepared by a semiconductor process as in the foregoing embodiment. The scanning motion of the probe electrode was conducted with a width of 1 μm and a length of 10 μm in the X and Y-directions, and the tracking was conducted with the apparatus of the configuration shown in FIG. 5. The electrical information recording was conducted by the application, between the specimen and the probe electrode 102, of a voltage superposed by consecutive pulses of heights of −6 V and +1.5 V by the bias circuit 3.

It was then confirmed that the reproduced information coincided with the recorded information, by extracting data from the obtained tunneling current and repeating such data reproduction plural times. It was also confirmed, from the result of image processing of the tunneling current, that the repeatedly reproduced image data mutually coincided with an error as small as 1 nm. It was furthermore confirmed, from the reproduced tunneling current image and the extracted information, that the recorded information could be erased by superposing a pulse voltage of a height of 3 V to the bias voltage when the probe electrode 102 was brought close to the recorded area.

In the foregoing there has been explained an information processing apparatus designed to measure the tunneling current as the physical information, but the present invention is likewise applicable to systems employing weak signals such as of interatomic force, capacity, magnetic flux or magnetic force.

What is claimed is:

1. An information processing apparatus for performing at least one of recording, reproduction and erasure of information by means of a probe electrode scanning a recording medium provided with at least one tracking groove, comprising:

a probe electrode;

moving means for positioning relative movement between said probe electrode and said recording medium;

drive means for sending a predetermined electrical drive signal to said moving means in such a manner that said probe electrode moves in a direction substantially perpendicular to said tracking groove;

detection means for detecting a physical effect between said probe electrode and said recording medium; and correction value generating means for detecting the tracking groove formed on the recording medium, based on the output of said detection means, and for detecting said drive signal on the basis of the timing of said detection, and for calculating a difference between the detected drive signal and a predetermined value so as to generate a correction value for correcting said relative movement on the basis of the calculated difference;

wherein said moving means is controlled according to said drive signal and said correction value.

2. An apparatus according to claim 1, further comprising means for comparing a detected latest drive signal with an average value of drive signals previously detected, and for controlling said moving means using said correction value only when the detected latest drive signal is smaller than said average value.

* * * * *